United States Patent [19]

Shirotori

[11] Patent Number: 4,818,907
[45] Date of Patent: Apr. 4, 1989

[54] BRUSHLESS MOTOR FOR DRIVING MAGNETIC DISKS

[75] Inventor: Yozo Shirotori, Nagano, Japan

[73] Assignee: Kabushiki Kaisha Sankyo Seiki Seisakusho, Nagano, Japan

[21] Appl. No.: 128,240

[22] Filed: Dec. 3, 1987

[30] Foreign Application Priority Data

Dec. 3, 1986 [JP] Japan .................. 61-185521

[51] Int. Cl.$^4$ .................. H02K 5/10; G11B 33/14
[52] U.S. Cl. .................. 310/67 R; 310/89; 360/97.02; 360/99.08
[58] Field of Search ............ 73/866.5; 310/45, 67 R, 310/68 R, 68 B, 68 C, 71, 88, 89, 268; 360/97, 98; 318/254

[56] References Cited

U.S. PATENT DOCUMENTS 4,339,875 7/1982 Müller ................ 310/68 R
4,518,886 5/1985 Kaneyuki ............. 310/88
4,725,904 2/1988 Dalziel ............... 360/97

Primary Examiner—Patrick R. Salce
Assistant Examiner—D. L. Rebsch
Attorney, Agent, or Firm—Sughrue, Mion, Zinn, Macpeak & Seas

[57] ABSTRACT

A brushless motor for driving magnetic disks comprises: a housing having at least one through hole therein; a stator attached to the housing; a rotor having a driving magnet in opposing relationship with the stator; an element for detecting the magnetic pole of the driving magnet removably fitted into the at least one through hole; and means for sealing one open end on the side of the rotor, both when the detecting element is fitted into the through hole, and when the detecting element is removed from the through hole.

16 Claims, 4 Drawing Sheets

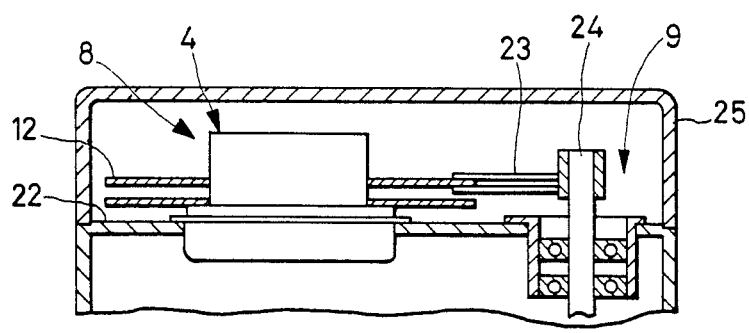
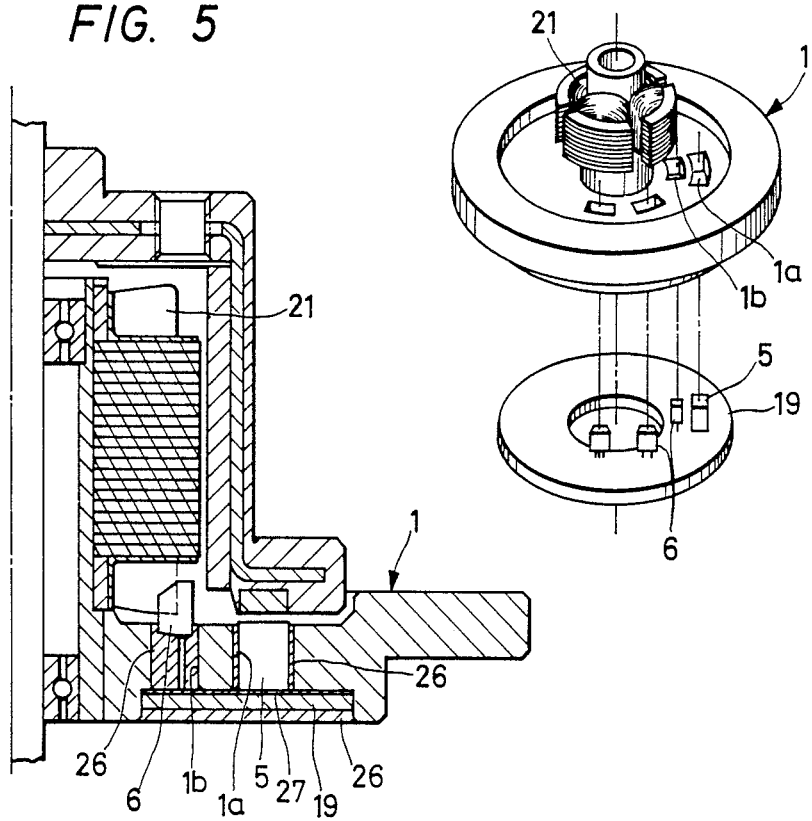

BRUSHLESS MOTOR FOR DRIVING MAGNETIC DISKS

BACKGROUND OF THE INVENTION

The present invention relates to a brushless motor for driving magnetic disks such as high density hard disks.

In the conventional hard disk device, as shown in FIG. 4, a magnetic disk device 8 and a magnetic head assembly 9 are mounted securely on a chassis 22. The magnetic disk device 8 includes a plurality of information signal recording media or magnetic disks 12, each having a large data packaging density and mounted on a hub 4 which is rotated by a brushless motor. With this arrangement, recording and reproduction are carried out by a magnetic head slightly floating above each surface of each magnetic disk.

The magnetic head is attached to a swing arm 23 which in turn is connected to a rotating shaft 24, so that the magnetic head is rotated through an extremely small angle by a stepper motor or the like, so as to track a magnetic disk.

The floating height of a magnetic head is on the order of 0.2-0.3 $\mu$m and, in order to ensure that this floating height is stably maintained, the magnetic-disk storage equipment is enclosed in an air-tight cover 25, so that the intrusion of the surrounding atmosphere and dust into the magnetic storage equipment is prevented and so that a predetermined desired degree of cleanliness can be maintained. However, as shown in FIGS. 5 and 6, which depict a motor designed, constructed and tested by the present inventor, a housing 1 of a motor is formed with through holes 1a and 1b through which magnetic sensors 5 and 6 and a coil 21 project, so that the surrounding air flows into the motor housing 1. As a result, a suitable means for maintaining the motor housing in an air-tight state is required. To this end, an air-tight sealing material such as epoxy resin 26 has been used to seal the magnetic-sensor-lead-wire holes 1a and 1b and the undersurface of a circuit board 19. However, there has arisen a problem that, once they are sealed in the manner described above, they cannot be disassembled in order to replace faulty circuit component parts.

SUMMARY OF THE INVENTION

In view of the above, a primary object of the present invention is to provide a brushless motor for driving magnetic disks in which an opening on the side of a rotor is hermetically sealed to prevent the intrusion of the surrounding air and dust to thereby maintain the interior of a cover at a desired degree of cleanliness so that the floating height of a magnetic head can be maintained in a stable and reliable manner.

To the above and other ends, the stator in a brushless motor is disposed in opposing relationship with a driving magnet mounted on a rotor and is securely mounted on a housing. The housing is formed with through holes for the insertion of magnetic sensors at least in the vicinity of the driving magnet so that the lead wire terminals of the magnetic sensors are withdrawn through the through holes. According to the present invention, the open ends of the through holes on the side of the rotor are sealed in such a way that the insertion of the magnetic sensors can be permitted.

The above and other objects, effects and features of the present invention will become more apparent form the description of the following preferred embodiments thereof taken in conjunction with the accompanying drawings.

BRIEF DESCRIPTION OF THE DRAWINGS

FIG. 4 is a sectional side view of a brushless motor for driving a magnetic hard disk device;

FIG. 5 is a sectional side view of an earlier design by the present inventor of a brushless motor for driving magnetic disks; and FIG. 6 is a perspective view illustrating the stator side thereof.

DESCRIPTION OF THE PREFERRED EMBODIMENTS

Figure 1:
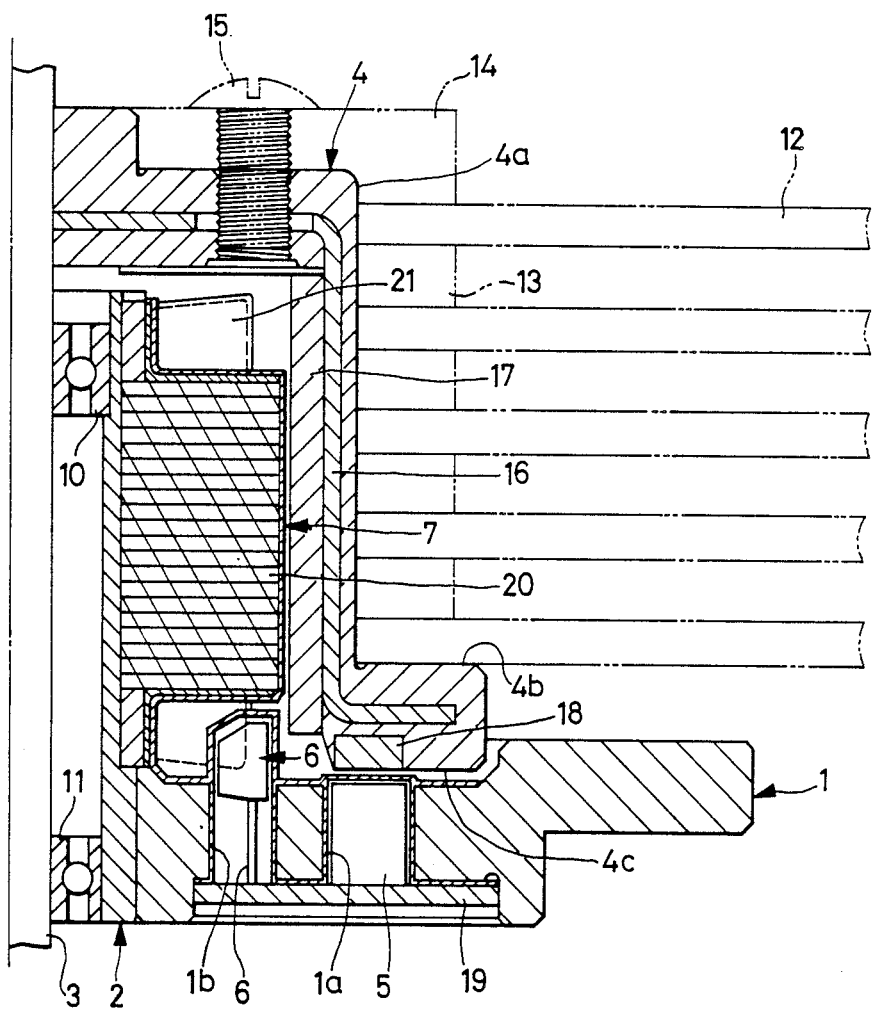
FIG. 1 is a sectional side view of a brushless motor for magnetic disks in accordance with the present invention.

In a first embodiment of a brushless motor for driving magnetic disks in accordance with the present invention as shown in FIG. 1, a shaft bearing holder 2 in the form of a hollow cylinder and made of a martensite series stainless steel (SUS403 or SUS420) or a bearing steel (SUJ2) has its lower end securely fitted into the center hole of a housing of a nonmagnetic material, fabricated by the aluminum die casting method, and bearings 10 and 11 are securely disposed in the hollow portion of the bearing holder 2 and a rotating shaft 3 is rotatably supported by the bearings 10 and 11.

A hub 4 of a nonmagnetic material which is fabricated by the aluminum die casting method is securely attached to the upper end of the rotating shaft 3 and a plurality of magnetic disks 12 are fitted into the cylindrical outer wall 4a of the hub 4 and are spaced apart from each other by a predetermined distance by spacers 13 interposed between the adjacent magnetic disks 12. The lowermost disk abuts a flange 4b. A disk clamp 14 is securely held in position by a screw 15 threadedly engaged with the hub 4, whereby the magnetic disks 12 are securely held in position on the hub 4. A magnetic yoke 16 fabricated by a molding method is inserted into the hub 4 and a portion of the inner surface of the yoke 16 is exposed. A driving magnet 17 is directly and securely attached to the exposed surface so that a magnetic circuit having a high degree of efficiency can be established. The hub 4, the yoke 16 and the driving magnet 17 constitute a rotor.

A small diameter index magnet 18 is embedded in the flange 4b of the hub 4 below the yoke 16 in such a way that one end of the index magnet 18 is exposed at the undersurface 4c of the flange 4b.

The housing 1 opposite the index magnet 18 is formed with a through hole 1a in which is disposed a magnetic sensor 5 such as Hall element, a magnet responsive resistor element, a magnetic head, a choke coil or the like in order to detect the magnetic field produced by the index magnet 18. The magnetic sensor 5 is connected to a circuit board 19.

A stator core 20 is fitted over the bearing holder 2 and is securely joined to the housing 1 with an adhesive or screws (not shown). A coil 21 is wound around the stator core 20 so that the hub 4 of the rotor is rotated when the coil 21 is energized. A through hole 1b is formed through the housing 1 on the lower end side of the stator core 20 and a magnetic sensor 6 such as a Hall element, a magnetic responsive resistor element or the like is fitted into the through hole 1b in order to detect the magnetic field produced by the driving magnet 17, thereby controlling the rotational speed of the rotor. A lead terminal 6a is connected to the circuit board 19.

Figure 2:
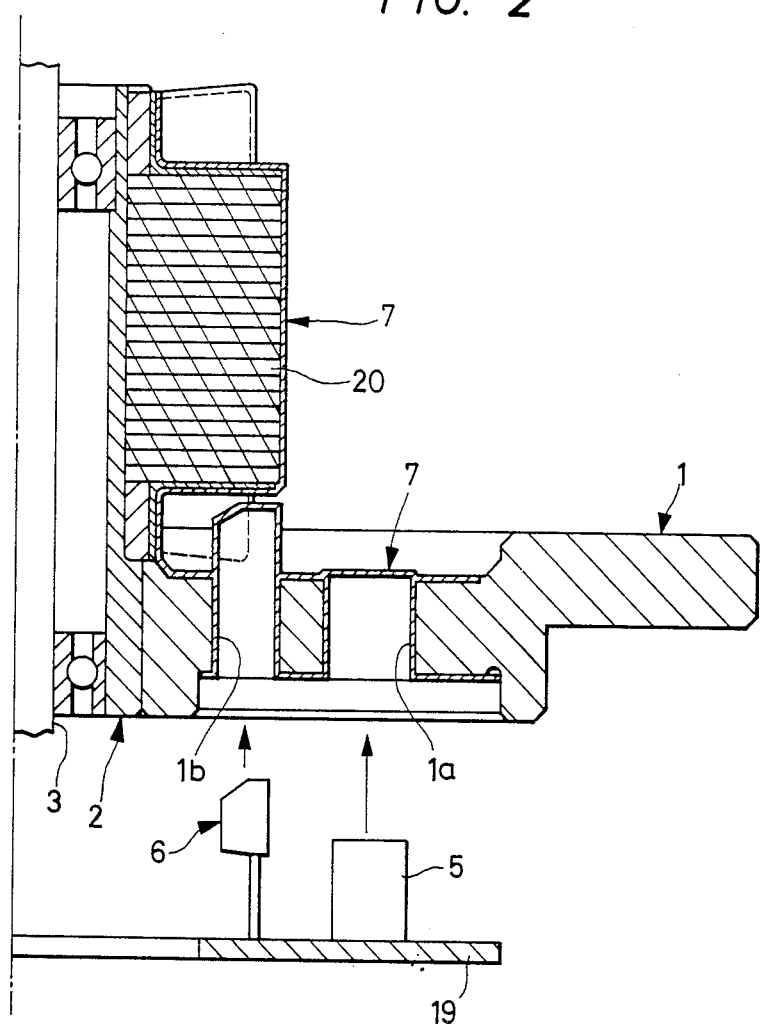
FIG. 2 is an exploded sectional side view thereof.

As shown in FIGS. 1 and 2, the outer surface of the bearing holder 2 and the stator core 20, both of which are securely mounted on the housing 1, and the upper ends of the holes 1a and 1b into which are fitted the magnetic sensors 5 and 6, respectively, are covered with an extremely thin resin sealing body 7 in such a way that the magnetic sensors 5 and 6 can be inserted into the through holes 1a and 1b, respectively.

Furthermore, the cylindrical inner surfaces of the through holes 1a and 1b and the undersurface of the housing 1 below the through holes 1a and 1b can be covered with the sealing body 7.

The circuit board 19 is securely mounted on the housing 1 with screws (not shown).

As described above, the open ends, at least on the side of the rotor, of the through holes 1a and 1b of the housing 1 to which the core 20 of the stator is securely attached are sealed with the sealing body 7 in such a manner that the insertion of the magnetic sensors 5 and 6 into the through holes 1a and 1b, respectively, can be permitted. As a result, the magnetic disks 12 are air-tightly sealed in a simple manner so that the intrusion of the surrounding air into the space in which the magnetic disks 12 are arranged is completely prevented. Thus, the floating height of the magnetic head can be maintained in a stable and reliable manner and therefore the magnetic head can track the magnetic disk with a high degree of accuracy. Furthermore, the space in which are arranged the magnetic disks 12 can be maintained at a desired degree of cleanliness.

The circuit board 19 can be easily detached from the housing 1 to permit the replacement of faulty component parts and, even when the circuit board is removed, the air-tightness of the space in which the magnetic disks are arranged can be securely maintained.

When the sealing body 7 comprises an insulating material, electrical isolation between the magnetic sensors 5 and 6 on the one hand and the housing 1 on the other hand can be maintained with a high degree of reliability.

In an earlier design by the present inventor of a brushless motor as shown in FIG. 6, an electrically insulating sheet 27 is interposed between the circuit board 19 and the housing 1 in order to electrically isolate soldered portions, but according to the present invention this is not necessary.

Figure 3:
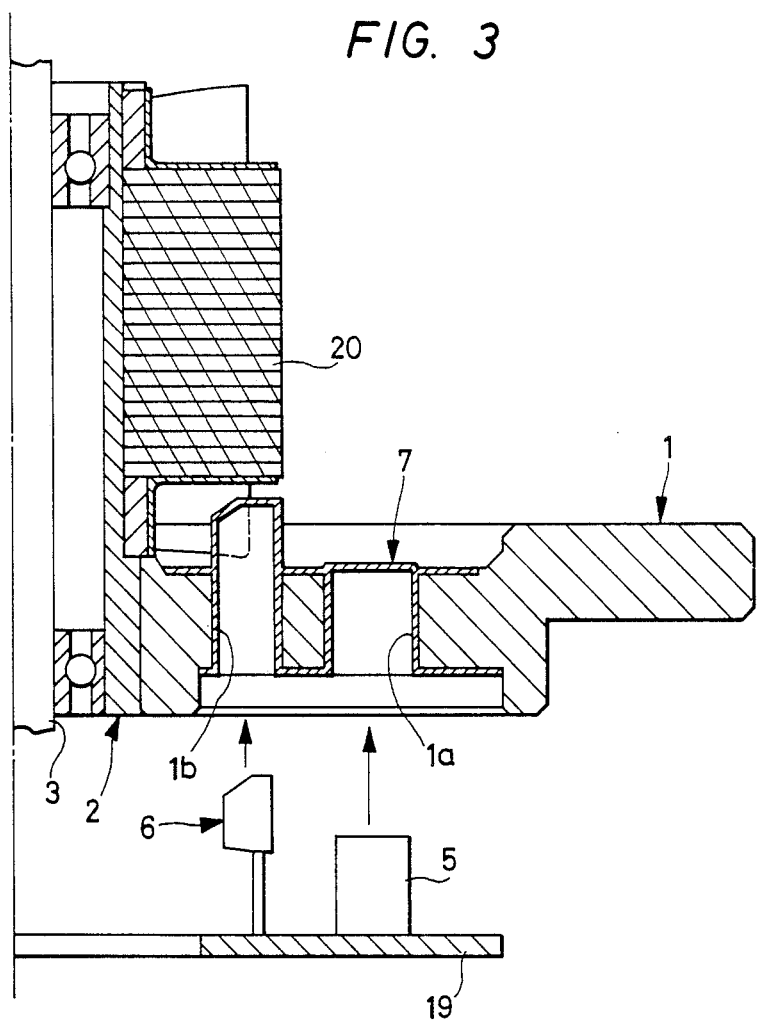
FIG. 3 is a sectional side view of a modification in which a housing is sealed.

FIG. 3 shows a modification of the first embodiment of the present invention in which only the upper and lower surfaces of the housing 1 are sealed with the sealing body 7.

The sealing with the sealing body is accomplished by an insert molding process.

As described above, according to the present invention, the open ends at least on the side of the rotor of the through holes of the housing are sealed with a sealing body in such a manner the insertion of the magnetic sensors into the through holes is permitted while still preserving the air-tight enclosure of the magnetic disks so that surrounding air cannot flow into the magnetic-disk space. As a result, the floating height of the magnetic head can be maintained in a stable manner and tracking can be carried out with a high degree of accuracy. In addition, the cleanliness of the magnetic-disk space can be reliably maintained. The circuit board can be easily removed from the housing for the replacement of faulty component parts, and the air-tightness of the magnetic-disk space can be ensured even when the circuit board is removed from the housing.

What is claimed is:

1. A brushless motor for driving magnetic disks, comprising:
    a housing having at least one through hole therein;
    a stator attached to said housing;
    a rotor having a driving magnet thereon disposed in opposing relationship with said stator;
    a detecting element for detecting a magnetic pole of said driving magnet removably fitted into said at least one through hole; and
    sealing means for sealing one open end on a side of said rotor when said detecting element is fitted into said through hole and when said detecting element is removed from said through hole.

2. A brushless motor for driving magnetic disks as defined in claim 1 wherein said detecting element comprises a Hall element.

3. A brushless motor for driving magnetic disks as defined in claim 1, wherein said sealing means comprises an electrically insulating material.

4. A brushless motor for driving magnetic disks as defined in claim 1, wherein said detecting element is connected to a circuit board which in turn is mounted on said housing on a side of said housing opposite said rotor.

5. A brushless motor for driving magnetic disks as defined in claim 2, wherein said Hall element is connected to a circuit board which in turn is mounted on said housing on a side of said housing opposite said rotor.

6. A brushless motor for driving magnetic disks as defined in claim 1, wherein a plurality of through holes are formed in said housing for receiving detecting elements.

7. A brushless motor for driving magnetic disks as defined in claim 1, wherein upper and lower surfaces of said housing are sealed with a sealing means.

8. A brushless motor for driving magnetic disks, comprising:
    a rotor having a magnet mounted thereon;
    a rotating shaft to which said rotor is secured;
    a stator disposed in opposing relationship to said driving magnet and surrounding said shaft;
    means for rotatably supporting said shaft passing through the center of said stator;
    a housing for holding said stator in position and having at least one through hole formed therein for insertion of a detecting element; and
    sealing means for sealing said at least one through hole at least at an end thereof closest to said rotor in such a manner that said detecting element can be inserted into said through hole to a position at which it can detect said magnet.

9. A brushless motor for driving magnetic disks as defined in claim 8, wherein said magnet comprises a driving magnet having a magnetic pole, and said detecting element senses said magnetic pole.

10. A brushless motor for driving magnetic disks as defined in claim 8, further comprising a hollow cylindrical bearing holder having a lower end fitted into a center of said housing and a plurality of bearings fitted to said bearing holder and spaced apart from each other by a suitable distance to rotatably support a rotating shaft.

11. A brushless motor for driving magnetic disks as defined in claim 8, wherein said rotor includes a hub of nonmagnetic material attached to one and of said rotating shaft and a magnetic yoke means secured to said hub, said magnet comprising a driving magnet secured to an exposed surface of said magnetic yoke means.

12. A brushless motor for driving magnetic disks as defined in claim 11, wherein said yoke means is made of iron.

13. A brushless motor for driving magnetic disks as defined in claim 11, wherein said hub is formed by an aluminum die casting process substantially in the form of a cup.

14. A brushless motor for driving magnetic disks as defined in claim 8, wherein said sealing means comprises an electrically insulating material.

15. A brushless motor for driving magnetic disks as defined in claim 1, wherein said detecting element is disposed closely adjacent said driving magnet.

16. A brushless motor for driving magnetic disks as defined in claim 15, wherein there is no ferromagnetic material between said detecting element and said driving magnet.

* * * * *